United States Patent
Fitch et al.

(10) Patent No.: US 8,155,929 B2
(45) Date of Patent: Apr. 10, 2012

(54) PROCESS FOR COMPUTING GEOMETRIC PERTURBATIONS FOR PROBABILISTIC ANALYSIS

(75) Inventors: Simeon H. K. Fitch, Charlottesville, VA (US); David S. Riha, San Antonio, TX (US); Ben H. Thacker, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 826 days.

(21) Appl. No.: 12/239,336

(22) Filed: Sep. 26, 2008

(65) Prior Publication Data

US 2010/0082305 A1 Apr. 1, 2010

(51) Int. Cl.
*G06F 17/10* (2006.01)
(52) U.S. Cl. .......................................................... 703/2
(58) Field of Classification Search ....................... 703/2
See application file for complete search history.

(56) References Cited

U.S. PATENT DOCUMENTS

2003/0063672 A1* 4/2003 Laurent-Chatenet .... 375/240.16
2005/0057569 A1* 3/2005 Berger ........................... 345/473

OTHER PUBLICATIONS

Kai Hormann et al.; "Mean Value Coordinates for Arbitrary Planar Polygons"; ACM Transactions on Graphics, vol. V, No. N; pp. 1-18, 2000.
D.S. Riha et al.; "Recent Advances of the NESSUS Probabilistic Analysis Software for Engineering Applications"; 43rd AIAA/ASME/ASCE/AHS/ASC; Structures, Structural Dynamics, and Materials Conference and Exhibit Non-Deterministic Approaches Forum; Denver, Colorado; pp. 16, Apr. 2002.
D.S. Riha et al.; "Capabilities and Applications of Probabilistic Methods in Finite Element Analysis"; The Fifth International Conference on Reliability and Quality in Design; Las Vegas, Nevada; pp. 6, Aug. 1999.
D.S. Riha et al.; "Probabilistic Engineering Analysis Using the NESSUS Software"; American Institute or Aeronautics and Astronautics; 1512; pp. 12, 2000.

* cited by examiner

*Primary Examiner* — Dwin M Craig
*Assistant Examiner* — Andre Pierre Louis
(74) *Attorney, Agent, or Firm* — Chowdhury & Georgakis PC; Ann C Livingston (57) ABSTRACT

A method for computing geometric perturbations for probabilistic analysis. The probabilistic analysis is based on finite element modeling, in which uncertainties in the modeled system are represented by changes in the nominal geometry of the model, referred to as "perturbations". These changes are accomplished using displacement vectors, which are computed for each node of a region of interest and are based on mean-value coordinate calculations.

7 Claims, 8 Drawing Sheets

PROCESS FOR COMPUTING GEOMETRIC PERTURBATIONS FOR PROBABILISTIC ANALYSIS

GOVERNMENT RIGHTS CLAUSE

This invention was made with U.S. Government support under Contract No. W-7405-ENG-36 awarded by the Department of Energy. The Government has certain rights in this invention.

TECHNICAL FIELD OF THE INVENTION

This invention relates to computer-implemented systems for modeling structural and mechanical components.

BACKGROUND OF THE INVENTION

Computer-implemented physics-based models are being increasingly used to predict the performance of engineered systems. The use of these performance models is especially important when real world testing is prohibitive.

One type of physics-based modeling system performs probabilistic analysis of engineered systems. Probabilistic algorithms are combined with general-purpose numerical analysis methods to compute the probabilistic response of structural or mechanical components. The system is modeled and uncertainty in loading, material properties, geometry, boundary conditions and initial conditions can be simulated. This performance modeling allows the reliability of the system to be predicted along with identifying important variables contributing to the reliability.

An example of a probabilistic performance modeling system is the NESSUS® probabilistic analysis software, initially developed by Southwest Research Institute for NASA to perform probabilistic analysis of space shuttle main engine components. NESSUS is now applied to a diverse range of problems including aerospace structures, automotive structures, biomechanics, gas turbine engines, geomechanics, nuclear waste packaging, offshore structures, pipelines, and rotordynamics.

Examples of uncertainties in engineered systems are loadings, environmental conditions, material strength, geometry, and manufacturing and assembly variations. In many cases, these uncertainties are not direct physics-based model parameters. For example, variations in the torque of a nut during assembly may be modeled as an initial penetration between two parts of the finite element model. Therefore, intermediate relationships between physical uncertainties and the physics-based model are required.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, in computer-implemented probabilistic analysis of engineered systems, uncertainties in the engineered system must be related to the physics-based model. The following description is directed to graphical (geometric) uncertainty modeling within the context of finite element analysis. Examples of geometric uncertainties are gaps, dimensions, and radii of holes. These uncertainties lead to changes in the nominal geometry, referred to as "perturbations".

The finite element method provides a general and systematic procedure for solving complex boundary value problems characteristic of real world engineering designs. The method involves dividing a possibly complex domain into a finite number of geometrically simple regions (elements) that can be represented in a simple mathematical way. These finite elements are defined by nodal points ("nodes") on their boundaries. The behavior of the domain due to loads and boundary conditions are governed by equations describing physical laws. With the criteria for continuity across element boundaries, the contribution of each element is accounted for and the governing equations are satisfied piecewise over the entire domain.

Some finite element models are created using solid modeling software tools, and geometry changes are relatively easy to accomplish. However, many models only contain nodal coordinates and element connectivity, and geometry changes are more difficult, especially in complex models.

For a probabilistic analysis, random variables that define the geometry of the structure require changes be made to the nodal coordinates of the finite element model. Modeling geometric variations can involve the movement of possibly thousands of nodes in a large finite element model.

Figure 1:
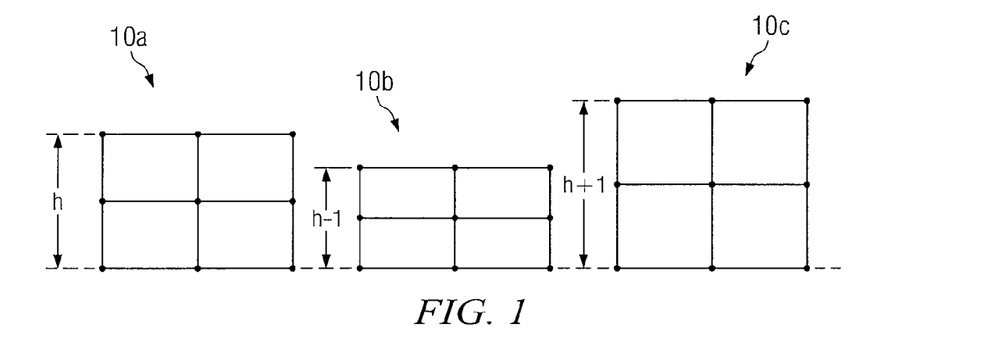
FIG. 1 illustrates a simple finite element model and how a random variable affects its nodes.

FIG. 1 illustrates a simple finite element model of a structural beam and how a random variable defining the height of the beam, h, affects its nodes. Three values of the random variable are shown: h, h−1, and h+1. Three versions of the model, 10a, 10b, and 10c are shown, which depend on the values of the random variable.

In the example of FIG. 1, the random variable is a "field random variable" because a change to the variable affects multiple quantities in the finite element model. A random variable that affects only a single quantity is called a "scalar random variable", and can be directly mapped from the random variable value to the finite element model.

Field random variables require a relationship between the random variable and finite element model, so that the finite element model can be modified for each value of the random variable. For example, if the random variable is the radius of a hole, changes to a set of nodal coordinate values are required each time the radius is changed. As explained below, this can be accomplished by defining a shape vector that relates how the finite element coordinates change for a given change in the random variable.

The methods described herein are particularly useful as part of a probabilistic analysis program that simulates variations and uncertainties in loads, geometry, material behavior and other user-defined inputs to compute probability of failure and probabilistic sensitivity measures of engineered systems. Such programs compute the probabilistic response (reliability) of virtually any engineered system where mathematical models can be developed to describe the performance of the system. For example, in a given structure, the structural response caused by uncertain basic variables such as loads, material properties, geometry, and boundary conditions can be predicted. Once a probabilistic response is quantified, the results can be used to support risk-informed decisions regarding reliability for safety critical and one-of-a-kind systems, and to maintain a level of quality while reducing manufacturing costs for larger quantity products.

An example of such an analysis program is the NESSUS probabilistic analysis software developed by Southwest Research Institute. NESSUS is interfaced to various major commercial finite element programs, and includes capabilities for analyzing computationally intensive real-world problems. It integrates advanced reliability methods with finite element analysis programs to model uncertainties in loads, material properties, and geometries with random variables to predict the probabilistic response of engineered systems. Probabilistic performance models implemented in the NESSUS software include using stress, strain, displacement, vibration, fatigue, fracture, and creep computed by finite element programs. The NESSUS software can perform reliability analyses for multiple components and failure modes, and identify critical random variables and failure modes to support structural design, certification, and risk assessment. It has been successfully applied to a diverse range of problems in aerospace, gas turbine engines, biomechanics, pipelines, defense, weaponry and infrastructure.

Figure 2:
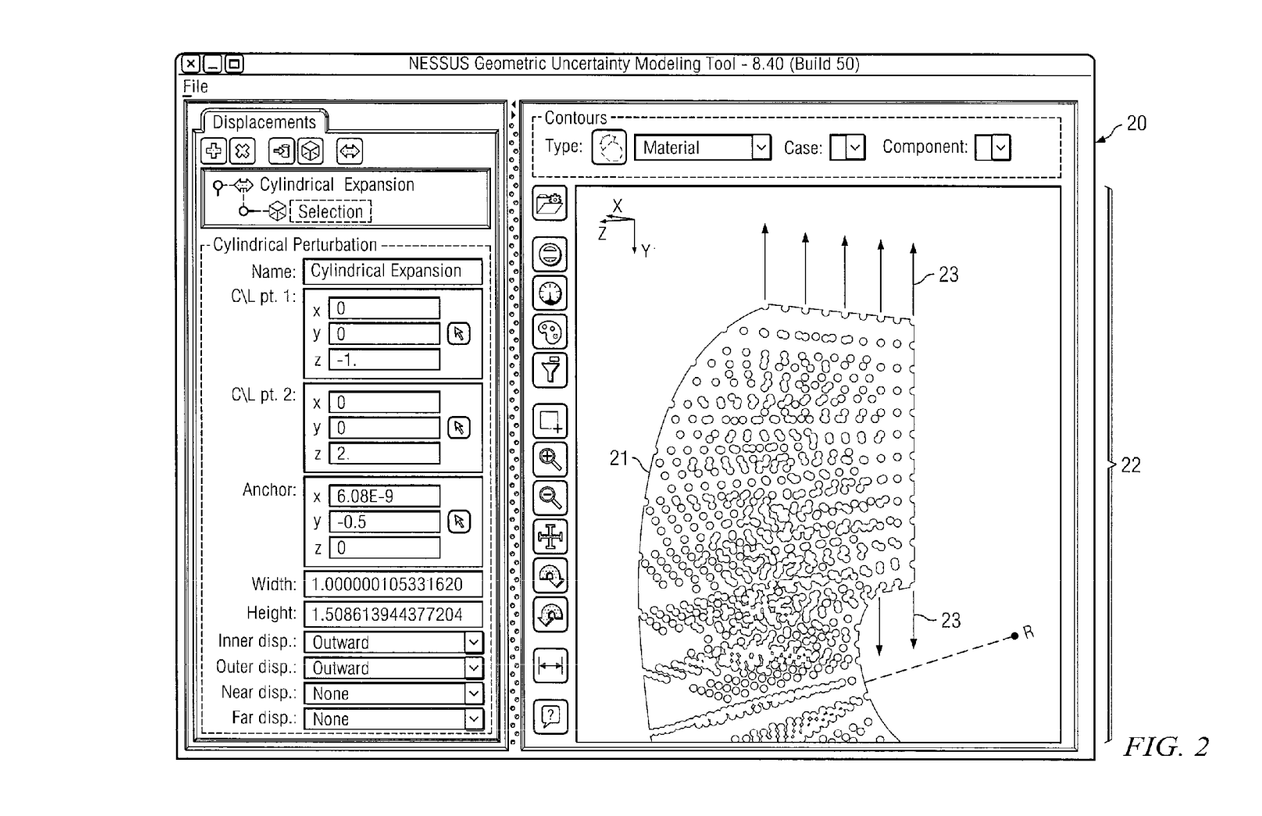
FIG. 2 illustrates an example of a user interface display page of a probabilistic modeling program, and explicitly illustrates shape vectors.

FIG. 2 illustrates an example of a user interface display page 20 for a geometric uncertainty modeling program. The model 21 is of a thick cylinder and the program models a change in the thickness of the cylinder. The graphical display window 22 illustrates use of a graphical tool set for constructing shape vectors 23 that define how the model changes for a specific variable. The shape vectors 23 are the arrows that show the direction in which the structure is to be changed.

The modeling example of FIG. 2 is of a cylindrical displacement mode. The user has selected nodes to be displaced, and a shape vector 23 is associated with each selected node. The shape vectors represent how the modeling program will change the thickness of the cylinder (inner and outer radii).

As further indicated in FIG. 2, the modeling program provides the following capabilities: three dimensional visualization of finite element models via neutral file format converters; model simplification via material filtering; planar/cartesian displacements; cylindrical displacements; model region selection by area, material, node location, and node ID query.

Figure 3:
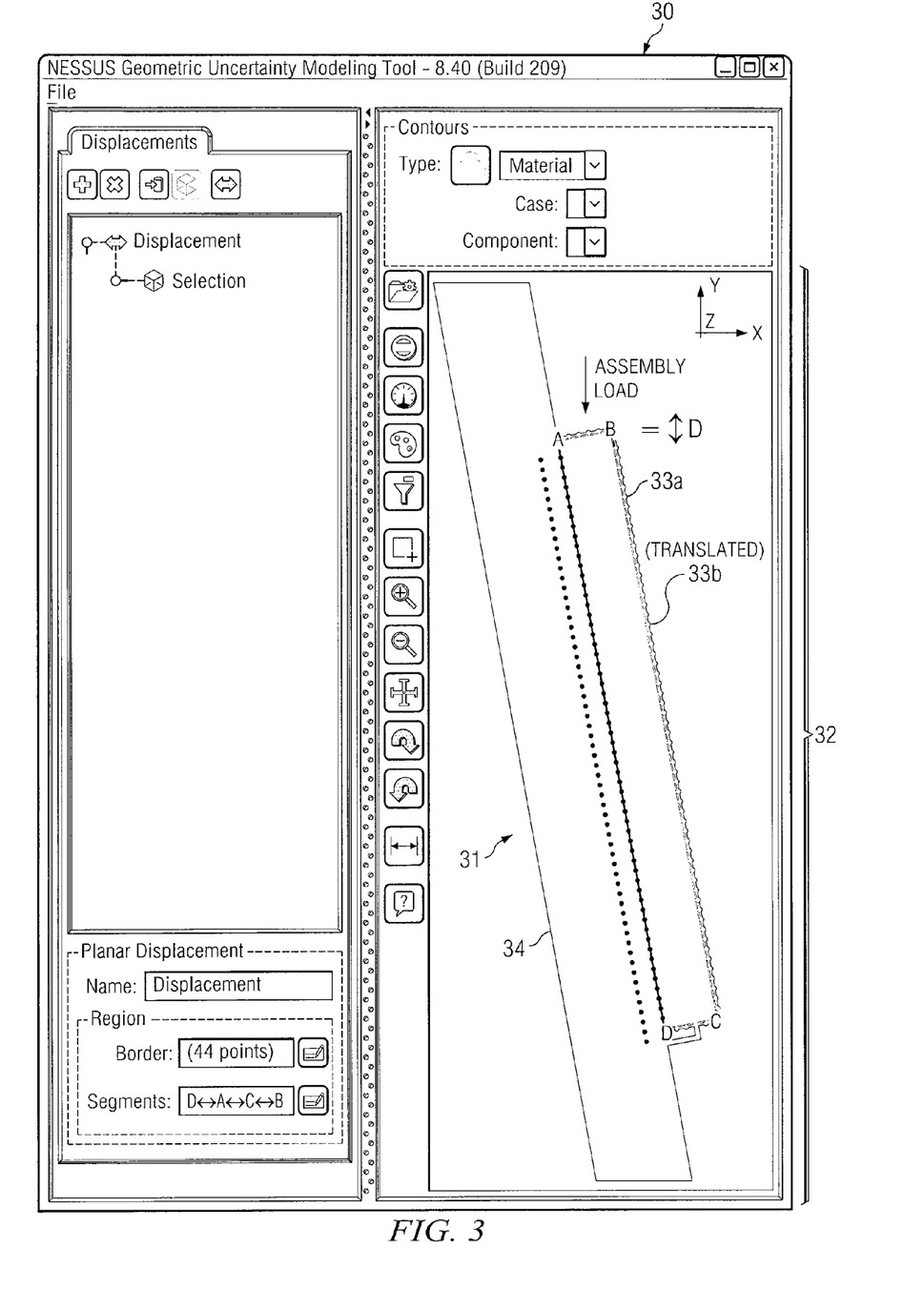
FIG. 3 is another example of a user interface display page of a probabilistic modeling program, and implicitly illustrates shape vectors.

FIG. 3 is another example of a user interface page 30 of a probabilistic modeling program. The modeling example of FIG. 3, as compared to that of FIG. 2, is of a planar displacement mode.

The finite element model 31 is graphically illustrated in box 32, and represents a press fit during an assembly process. This model 31 is a simple but representative example of a finite element model to demonstrate the creation of shape vectors.

Component 33 of the model is a mount (initial position 33a, translated position 33b), and component 34 is a shell. The mount is press fit into the shell structure. Thus, the graphical display box 32 is a "before and after" view of the model, as indicated with overlapping views of component 33.

The mount 33 travels a distance, D, during this process to a prescribed clearance. Variations exist in the press fit process and the translated mount represents these variations in the finite element model.

The dashed lines with letters at the vertices (A, B, C and D) identify the region of the model that will be scaled. The user may move these vertices independently to represent complex transformations and scaling. The region of displacement is defined by a set of line segments, which are the lines between the vertices (A, B, C and D). Shape vectors are implicit at these vertices, and in this example the shape vectors point in the same direction and are of the same magnitude.

The translated mount 33b is a representation of the transformation based on a created shape vector. This shape vector relates the preload variable to an initial penetration in the finite element model by translating the specified nodes.

Figure 4:
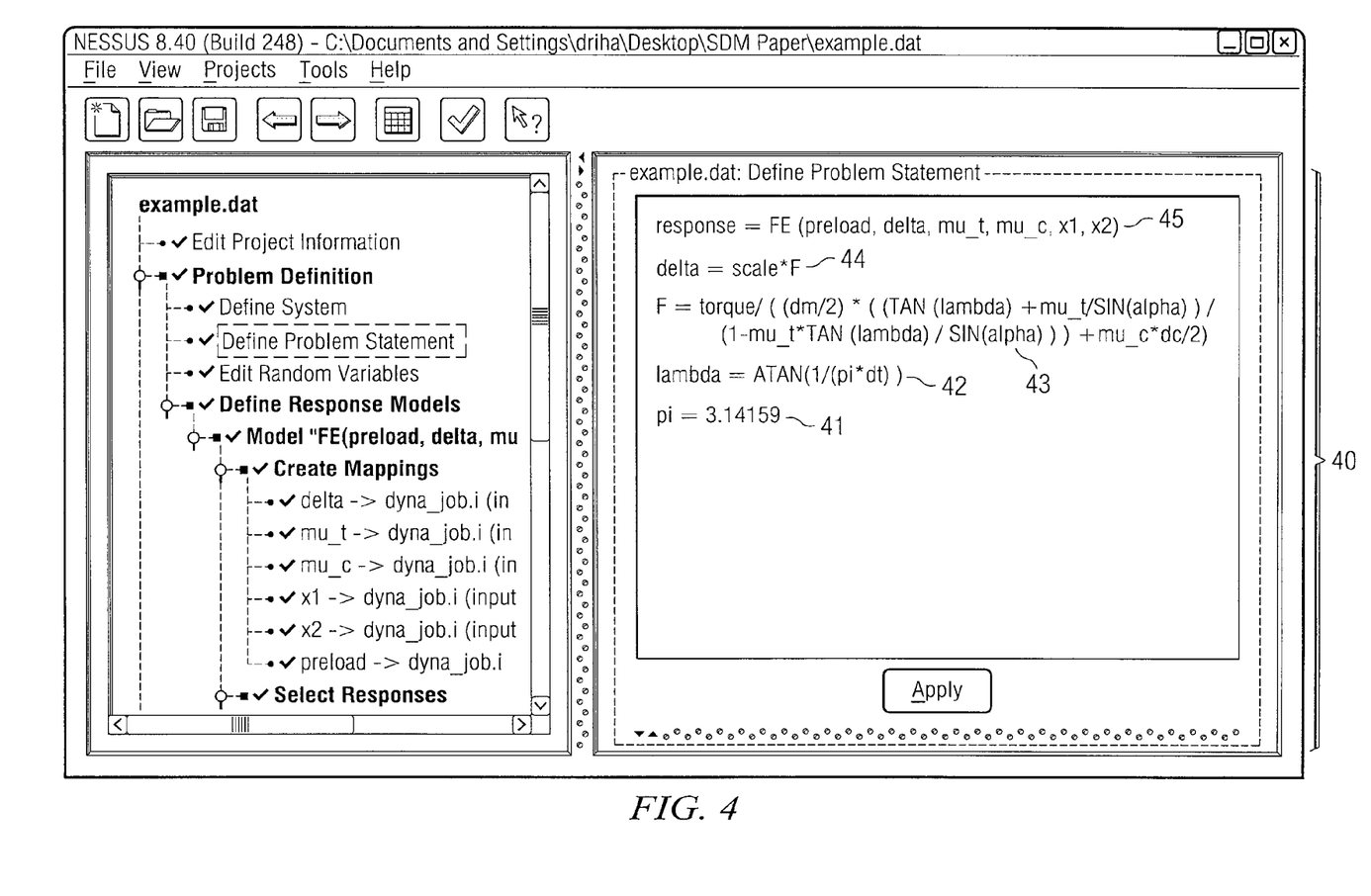
FIG. 4 illustrates the problem statement for the model of FIG. 3.

FIG. 4 illustrates an example of a problem statement for a model of a threaded assembly, that relates torque to initial penetration in a finite element model. A real-world example of the problem is an assembly process in which a nut is tightened on a threaded component. The assembly specifications provide a specified torque with tolerances. The tightening of the nut is not directly modeled, but rather the correct stresses are induced between the threads using an initial penetration between the two components. This initial penetration is modeled by changing nodal coordinate values in the finite element model.

The problem statement is set out in display window 40. The probabilistic model of this system includes two torque loadings, friction coefficients, and environmental load. Random variables may be used to predict the probabilistic response of a displacement metric at a specific location in the system.

The problem statement is most easily understood by being evaluated from the bottom to the top. Equations 41-43 describe the torque and preload relationships. Equation 44 defines the initial penetration as a function of preload. The top level function 45 relates the response of interest to a function FE. The FE function can be defined from a library of interfaces to commercially available finite element codes, in-house tools, and/or user-defined external programs. This function has arguments that include both deterministic and random variables that are used in the finite element analysis. The mu_t and mu_c values are friction coefficients that are used in the preload/torque relations and also in contact definitions in the finite element model. The x1 and x2 variables that represent other load and material variables.

Referring to FIGS. 3 and 4, the preload variable describes the initial penetration in component 32. A shape vector for this initial penetration is created. The shape vector is converted to displacement vectors, which can be mathematically used as input for a transformed finite element model.

Figure 5:
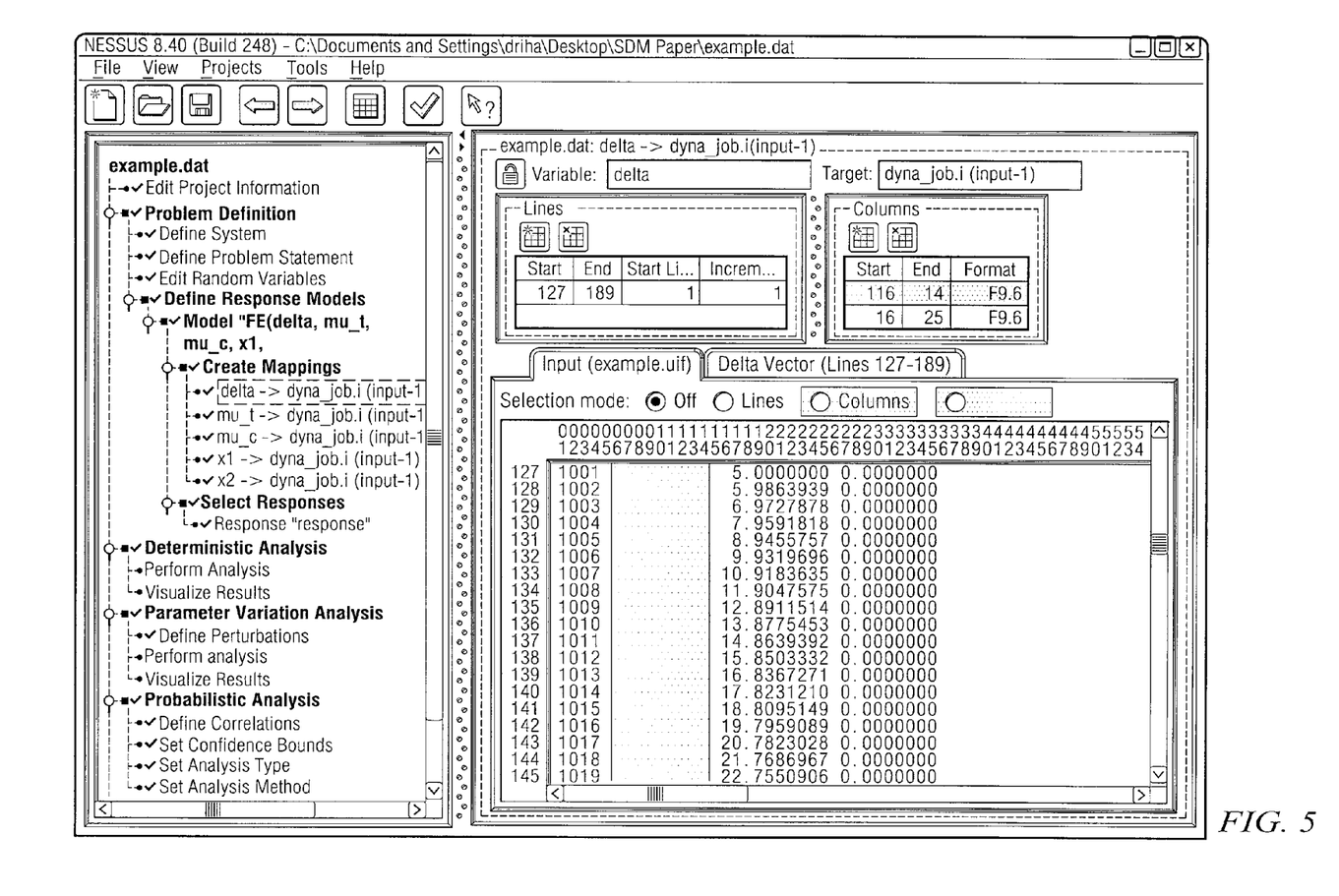
FIG. 5 is a user interface display page that illustrates the mapping of a delta vector (normalized displacement vector) to the finite element model.

FIG. 5 is a user interface display page 60 that illustrates the mapping of a delta vector (a normalized displacement vector) to the finite element model. In this manner, the modeling program provides the user with a graphical tool to highlight the rows and columns that will change when the variable changes. This mapping capability provides a quick and accurate means to relate variables to the finite element input. The graphical approach allows visualization to verify that the variable is mapped to correct portions of the finite element input. A finite element model can be automatically created for any value of the variable once the shape vectors are developed and variable is mapped to the finite element input.

As explained below in connection with FIGS. 6-9, the procedure for displacement vector creation involves the following steps:
1. Graphically select nodes
2. Define transformation
3. Compute delta vector (normalized displacement vector)
4. Verify displacement
5. Generate graphical finite element model input Once the model input is generated, the finite element model can be recreated for any value of the variable.

Figure 6:
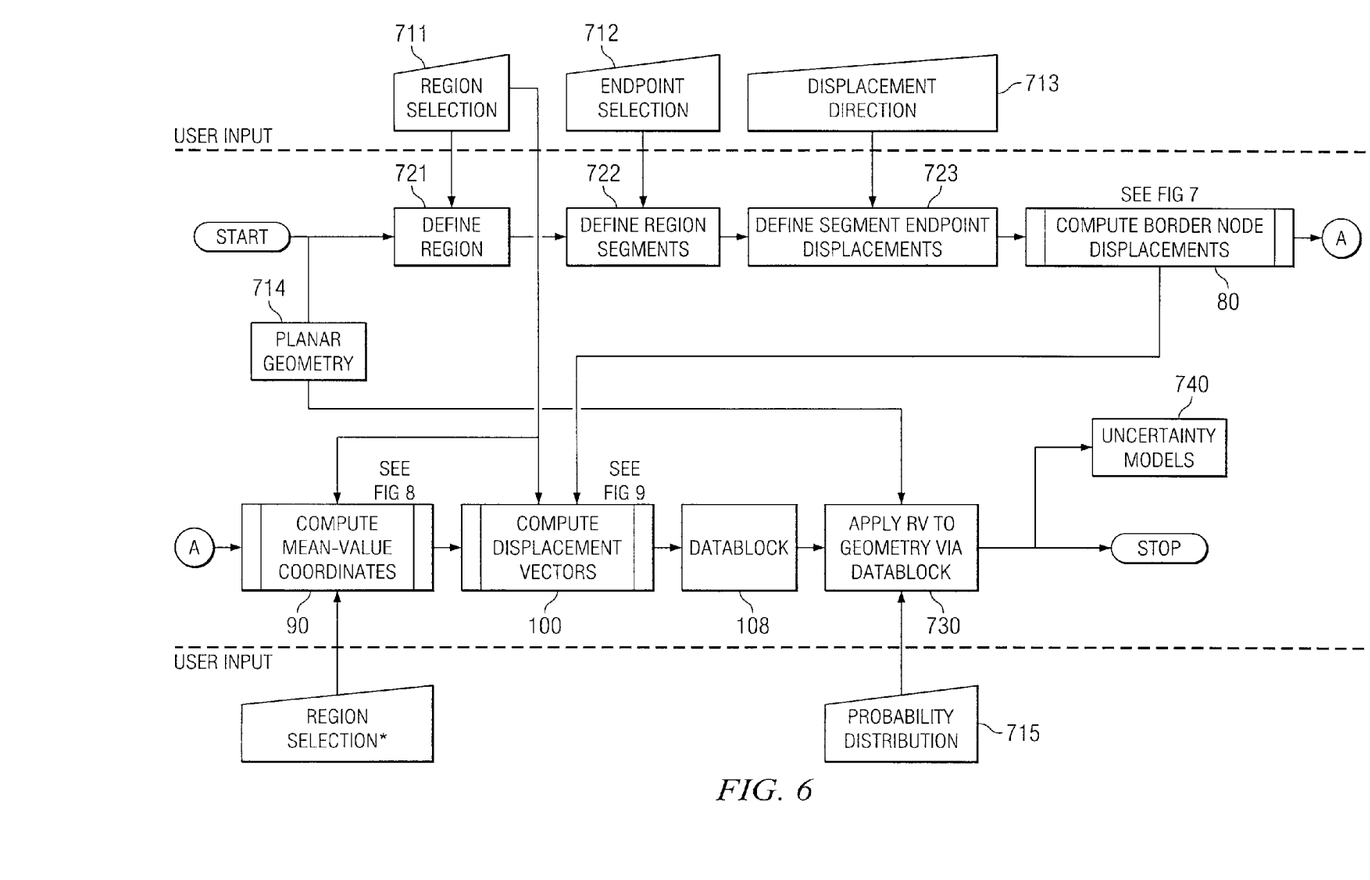
FIG. 6 illustrates a method, performed by the modeling program, of converting shape vectors into displacement vectors.

FIG. 6 illustrates a method, performed by the modeling program, of converting shape vectors into normalized nodal displacement vectors. In other words, the user friendly abstraction (i.e., a graphical shape vector) is converted to specific nodal displacements required by the modeling program. That is, the shape vector is mapped to a translation transformation on the nodal point locations in the finite element model input file.

Shape vectors are explicitly illustrated in FIG. 2 and are implicit in FIG. 3. The process of FIG. 6 is used to determine where the selected nodes (23) or the nodes inside the selected region (31a) end up when the displacement is performed.

Steps 711-713 are user input steps. The user specifies a region, endpoints, and a displacement direction. This input can be performed using any type of interface display, such as the graphical input illustrated above.

In Step 721, the program uses the region selection input to define a region of interest. In Step 722, the program uses the region and the endpoint input to define region boundary segments. In Step 723, the program uses the region boundary segments and the displacement input to define boundary segment endpoint displacements.

Figure 7:
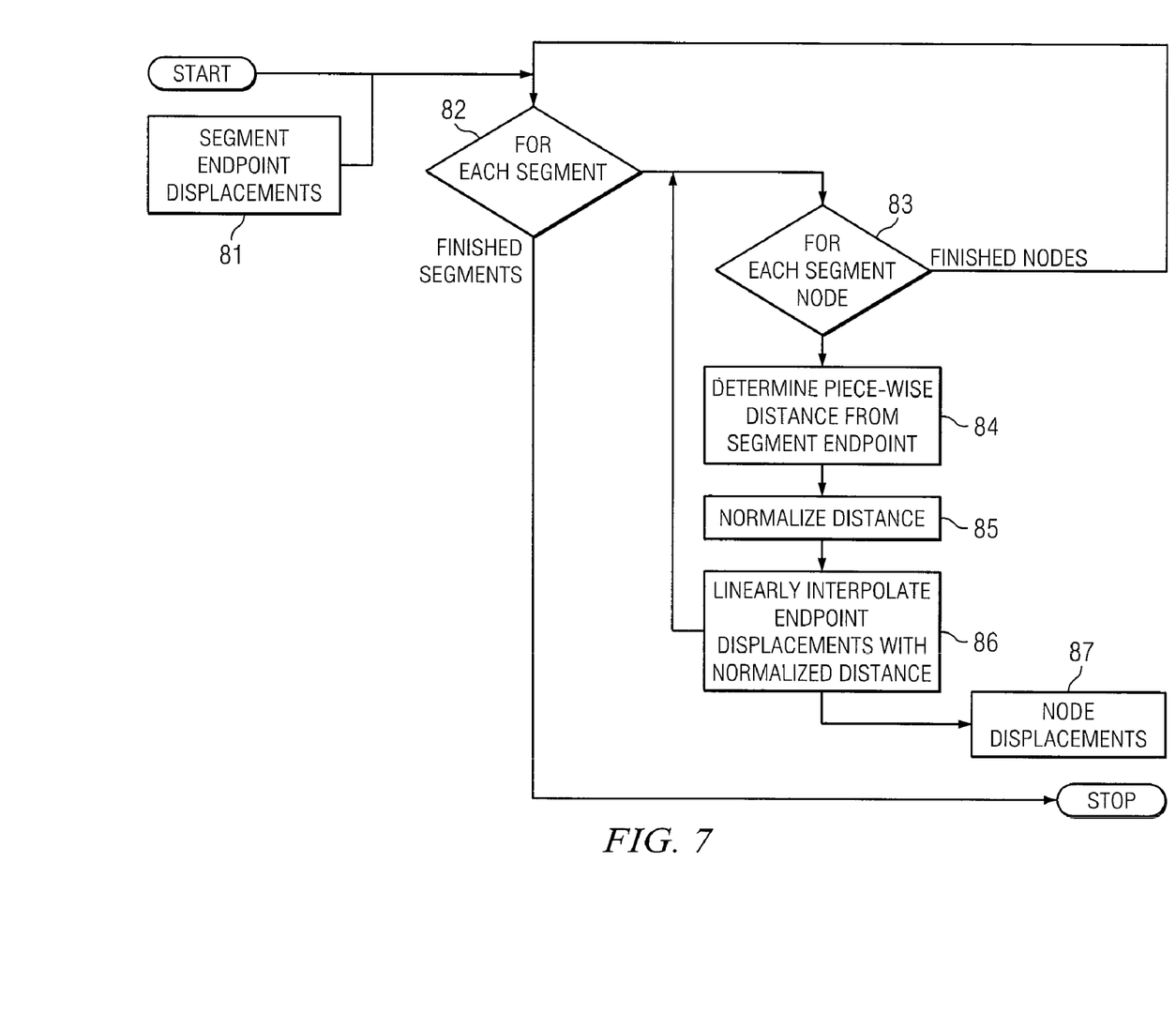
FIG. 7 illustrates the process, from FIG. 6, of computing border node displacements.

Step 80 is computing border node displacements, and this process is illustrated in FIG. 7. In Data Step 81, this process receives the segment endpoint displacements computed in Step 723. Each segment has two or more associated nodes, as indicated by loop steps 82 and 83. In Step 84, for each segment node, the process determines a piecewise distance from the segment endpoint. In Step 85, this distance is normalized. In Step 86, endpoint displacements are linearly interpolated with the normalized distance. As indicated in Data Step 87, the process has now generated the displacements associated with the nodes of the region boundary segments.

Again referring to Loop Steps 82 and 83, as each node of a segment is processed by Steps 84-86, that node is "finished", and when all nodes of that segment are finished, the segment is "finished" and the next segment is processed.

Figure 8:
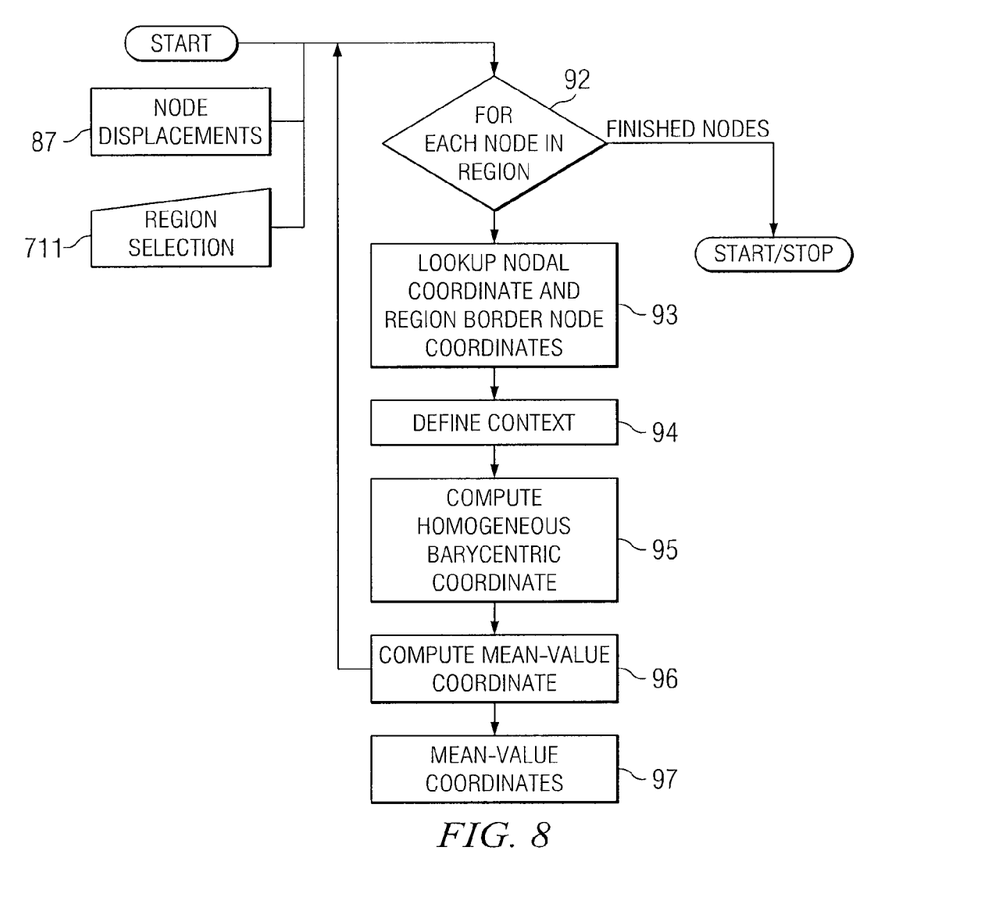
FIG. 8 illustrates the process, from FIG. 6, of computing mean value coordinates.

Referring again to FIG. 6, Step 90 is computing mean-value coordinates, and this process is illustrated in FIG. 8. The process receives the region boundary segment node displacements from Step 87, as well as the region selection from Step 711. As indicated by Loop Step 92, each node is processed. Steps 93-96 computing mean-value coordinates for each node in the region selection. An example of a method for suitable mean value calculations are described by K. Hormann and M. Floater in various publications. An example publication describing the method is entitled "Mean Value Coordinates for Arbitrary Planar Polygons", ACM Transactions on Graphics, Vol. 25, Issue 4, 2006, with relevant portions incorporated herein by reference.

More specifically, in Step 93, the process performs a lookup for the nodal coordinate and the region border node coordinates. In Step 94, the process uses these coordinates to define a context, which is the relationship of the current nodal coordinate to the border nodes. In Step 95, the process computes homogeneous barycentric coordinates for the current node within its context. In Step 96, the process uses the results of Step 95 to compute mean-value coordinates of the current node. As indicated by Data Step 97, the process of FIG. 8 thereby generates a set of mean-value coordinates associated with the nodes of the region of interest.

Figure 9:
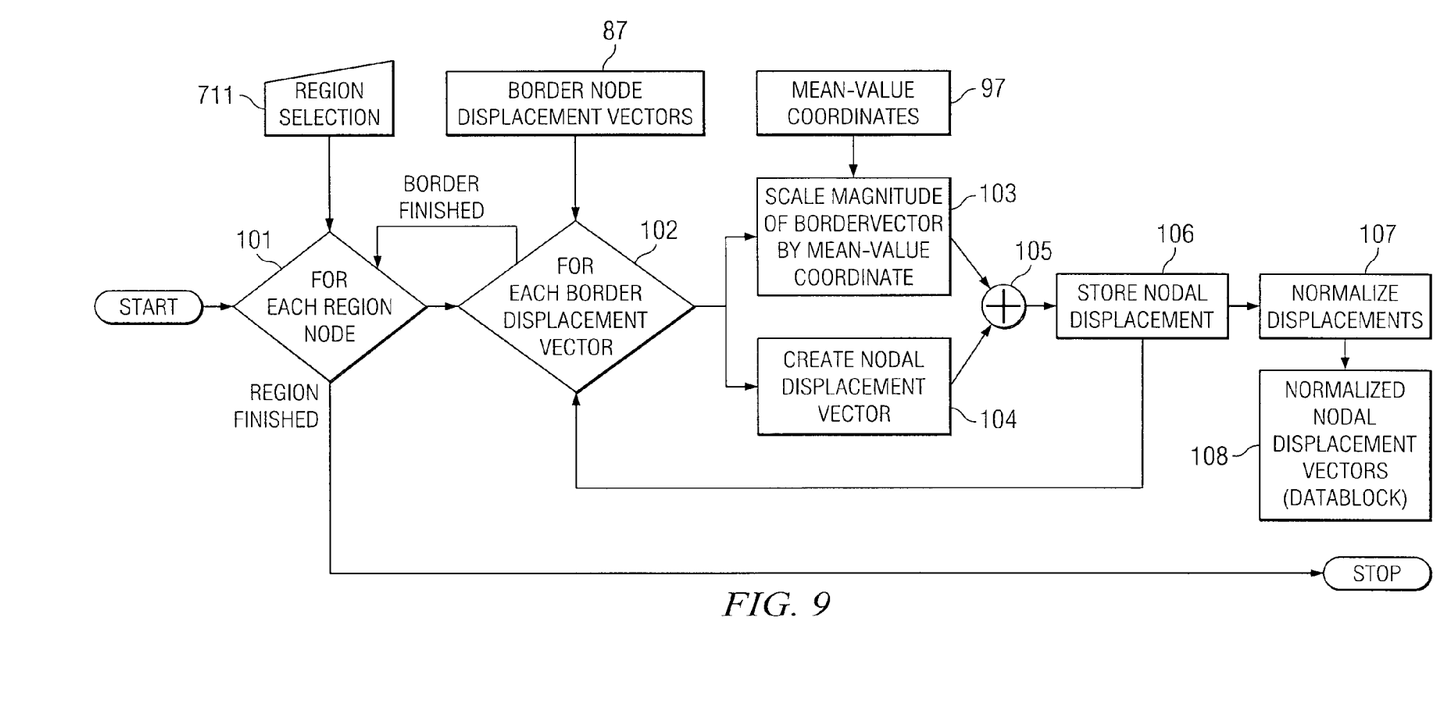
FIG. 9 illustrates the process, from FIG. 6, of computing displacement vectors.

Referring again to FIG. 6, Process Step 100 is computing displacement vectors, and this process is illustrated in FIG. 9. The input data to the process includes the region selection input 711, the border node displacement vectors 87, and the mean-value coordinates 97.

As indicated by Loop Steps 101 and 102, the displacement vector computation process operates on each node and each border of the region. Each border has associated border displacement vectors from the input file 87.

Steps 102-107 involve selecting each node and creating an associated node displacement vector by computing a weighted average of all border displacement vectors, where the weight is the mean value coordinate.

More specifically, in Step 103, for each border displacement vector, its magnitude is scaled (weighted) by an associated mean value coordinate from the input file 97. In Step 104 and 105, the scaled border displacement vectors are used to create a nodal displacement vector for the associated node. All border displacement vectors are added, each weighted by its own mean value coordinate. The resulting nodal displacement vector is stored in the nodal displacement data file in Step 106.

Step 107 is normalizing the displacement vectors stored in Step 106 (the "division" part of the weighted average). The result is a set of normalized nodal displacement vectors. In Step 108, these vectors are stored as a datablock, which is a matrix format of nodal displacements.

Referring again to FIG. 6, the normalized nodal displacement vectors (stored as "datablock" 108), are input to an uncertainty modeling process 730, which applies the random variable (RV) to planar geometry input 714. The uncertainty modeling is the result of user-selected probability distribution algorithm 715, and generates various uncertainty models 740. The NESSUS program referenced above is an example of an uncertainty modeling program replete with various modeling options.

Referring again to FIG. 2, the modeling program also provides a cylindrical displacement mode, which can be graphically presented as a variation of the planar displacement mode of FIG. 3. For comparison, the planar displacement mode can be deemed a "two dimensional" mode. The cylindrical displacement mode can be deemed as rotating a two-dimensional mode about an axis (i.e. axisymmetric), where each plane is like a cut of a pie. For each slice, a planar displacement is performed using the process described above in connection with FIGS. 6-9. In the example of FIG. 2, for the cylindrical displacement mode, the shape vectors are constrained along radial and/or axial directions, but other implementations of the invention need not have this constraint. As stated above, FIG. 3 indicates the selected nodes that are to be displaced.

What is claimed is:
1. A computer-implemented method of computing normalized nodal displacement vectors, which change nodal coordinates of a finite element model in response to a change in a random variable, comprising:
displaying the finite element model;
providing a graphical user interface that receives user input applied to the displayed model in graphical form repre- senting the following data: a region of the finite element model, the region having endpoints, and a displacement direction;

calculating boundary segments and boundary segment endpoint displacements from the input data;

For each segment, using the boundary segment endpoint displacements to compute displacements of border nodes of the segment, thereby providing a set of border node displacement vectors;

Computing mean-value coordinates for each node of the region;

Computing displacement vectors for each node of the region, based on the border node displacement vectors, the input data and the mean-value coordinates;

normalizing the displacement vectors, thereby generating a set of normalized nodal displacement vectors; and Storing the normalized nodal displacement vectors for use as input to the finite element model.

2. The method of claim 1, wherein the step of computing displacements of boundary nodes is performed for each segment node by: determining a piecewise distance from a segment endpoint node; normalizing that distance; and interpolating the associated endpoint displacement with the normalized distance.

3. The method of claim 1, wherein the step of computing mean-value coordinates is performed by using a barycentric calculation method.

4. The method of claim 1, wherein the step of computing mean-value coordinates is performed for each node, by the following steps applied to each node: accessing node coordinates and associated boundary node coordinates; defining a context based on the foregoing step; computing a homogeneous barycentric coordinates for the node; and using the results of the preceding step to compute mean-value coordinates for the node.

5. The method of claim 1, wherein the step of computing displacement vectors is performed by the following steps: weighting the magnitude of each border displacement vector by an associated mean value coordinate; and computing an average of the weighted border displacement vectors.

6. A computer-implemented method of changing the nodal coordinates of a finite element model in response to a change in a random variable, comprising:

displaying the finite element model;

providing a graphical user interface that receives user input applied to the model in graphical form representing the following input data: a region of the finite element model, the region having endpoints, and a displacement direction;

calculating boundary segments and boundary segment endpoint displacements from the input data;

for each segment, using the boundary segment endpoint displacements to compute displacements of border nodes of the segment, thereby providing a set of border node displacement vectors;

Computing mean-value coordinates for each node of the region;

Computing displacement vectors for each node of the region, based on the border node displacement vectors, the input data and the mean-value coordinates;

normalizing the displacement vectors, thereby generating a set of normalized nodal displacement vectors;

Storing the normalized nodal displacement vectors for use as input to the finite element model;

Applying a random variable to the normalized nodal displacement vectors; and

Calculating nodal displacements in response to the applying step.

7. The method of claim 6, further comprising the step of graphically displaying the model with the nodal displacements represented by geometric perturbations of the model.

* * * * *